US012250448B2

(12) United States Patent
Schubert et al.

(10) Patent No.: US 12,250,448 B2
(45) Date of Patent: Mar. 11, 2025

(54) INTELLIGENT VIDEO CONFERENCE CROPPING BASED ON AUDIO AND VISION

(71) Applicant: GENTEX CORPORATION, Zeeland, MI (US)

(72) Inventors: Christian Schubert, Schandelah (DE); Matthew W. Remijn, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 151 days.

(21) Appl. No.: 17/953,543

(22) Filed: Sep. 27, 2022

(65) Prior Publication Data

US 2023/0104622 A1   Apr. 6, 2023

Related U.S. Application Data

(60) Provisional application No. 63/250,495, filed on Sep. 30, 2021.

(51) Int. Cl.
*H04N 23/62* (2023.01)
*G06F 3/16* (2006.01)
(Continued)

(52) U.S. Cl.
CPC ............. *H04N 23/62* (2023.01); *G06F 3/167* (2013.01); *G06V 20/597* (2022.01);
(Continued)

(58) Field of Classification Search
CPC .... H04N 23/62; H04N 5/2628; G06V 20/597; G06V 40/164; G06V 40/20; G06F 3/167; H04L 12/1813
See application file for complete search history.

(56) References Cited

U.S. PATENT DOCUMENTS 5,334,969 A   8/1994   Abe et al.
5,825,527 A   10/1998  Forgette et al.
(Continued)

FOREIGN PATENT DOCUMENTS

CN   202608663 U   12/2012
CN   105657329 B   11/2018
(Continued)

OTHER PUBLICATIONS

Durbin, Dee-Ann, AP, "New Ford System Helps Warn Police of Approaches," USA Today, Jul. 19, 2013, 4 pages, Web, <https://www.usatoday.com/story/money/cars/2013/07/19/ford-system-warns-police/2568397/>.

(Continued)

*Primary Examiner* — Olisa Anwah
(74) *Attorney, Agent, or Firm* — Price Heneveld LLP; Brian James Brewer

(57) ABSTRACT

A video conferencing system for a vehicle includes a display device disposed in a passenger compartment of the vehicle, the display device comprising a screen, a first imager configured to capture a first image data corresponding to a field of view of a passenger compartment of the vehicle, at least one microphone configured to collect audio data from within the passenger compartment, and a controller. The controller is configured detect a display prompt within the image data corresponding to a portion of the image data received from the first imager, detect an audio prompt within a predetermined zone of the passenger compartment of the vehicle, and selectively crop the first image data according to the portion of the image data corresponding with the display prompt in response to determining a correlation between the portion of the image data and the zone of the passenger department associated with the audio prompt.

8 Claims, 5 Drawing Sheets

(51) Int. Cl.
  *G06V 20/59* (2022.01)
  *G06V 40/16* (2022.01)
  *G06V 40/20* (2022.01)
  *H04L 12/18* (2006.01)
  *H04N 5/262* (2006.01)

(52) U.S. Cl.
  CPC ............ *G06V 40/164* (2022.01); *G06V 40/20* (2022.01); *H04L 12/1813* (2013.01); *H04N 5/2628* (2013.01)

(56) References Cited

U.S. PATENT DOCUMENTS

| | | | |
|---|---|---|---|
| 5,883,605 A | 3/1999 | Knapp | |
| 5,917,430 A | 6/1999 | Greneker, III et al. | |
| 5,978,519 A * | 11/1999 | Bollman | G06T 7/70 382/270 |
| 6,170,956 B1 | 1/2001 | Rumsey et al. | |
| 6,265,968 B1 | 7/2001 | Betzitza et al. | |
| 6,346,698 B1 | 2/2002 | Turnbull | |
| 6,407,468 B1 | 6/2002 | Levesque et al. | |
| 6,420,800 B1 | 7/2002 | Levesque et al. | |
| 6,552,326 B2 | 4/2003 | Turnbull | |
| 6,572,233 B1 | 6/2003 | Northman et al. | |
| 6,737,630 B2 | 5/2004 | Turnbull | |
| 6,870,655 B1 | 3/2005 | Northman et al. | |
| 7,403,101 B2 | 7/2008 | Kropinski et al. | |
| 7,447,320 B2 | 11/2008 | Bryson et al. | |
| 7,570,155 B2 | 8/2009 | Horii | |
| 7,852,369 B2 | 12/2010 | Cutler et al. | |
| 7,983,817 B2 | 7/2011 | Breed | |
| 8,111,282 B2 | 2/2012 | Cutler et al. | |
| 8,564,662 B2 | 10/2013 | Busch et al. | |
| 8,582,052 B2 | 11/2013 | Ockerse | |
| 8,766,846 B2 | 7/2014 | Kiehne | |
| 8,903,130 B1 | 12/2014 | Carceroni et al. | |
| 9,106,789 B1 | 8/2015 | Shipman, Jr. et al. | |
| 9,376,059 B2 | 6/2016 | Mauderer et al. | |
| 9,641,585 B2 | 5/2017 | Kvaal et al. | |
| 9,674,453 B1 | 6/2017 | Tangeland et al. | |
| 9,769,419 B2 | 9/2017 | Tangeland et al. | |
| 9,800,983 B2 | 10/2017 | Wacquant et al. | |
| 9,978,389 B2 | 5/2018 | Buck et al. | |
| 10,666,901 B1 | 5/2020 | Zheng et al. | |
| 10,769,434 B2 | 9/2020 | Weller et al. | |
| 2001/0013835 A1 | 8/2001 | Hsu et al. | |
| 2002/0101505 A1* | 8/2002 | Gutta | H04N 7/15 348/E7.083 |
| 2003/0169339 A1* | 9/2003 | Allen | G01S 3/7864 348/169 |
| 2004/0037436 A1 | 2/2004 | Rui | |
| 2004/0090525 A1 | 5/2004 | Eichmann | |
| 2005/0075770 A1 | 4/2005 | Taylor et al. | |
| 2005/0134441 A1 | 6/2005 | Somuah | |
| 2005/0190048 A1 | 9/2005 | Yagyu et al. | |
| 2005/0270620 A1 | 12/2005 | Bauer et al. | |
| 2006/0050356 A1 | 3/2006 | Varaprasad et al. | |
| 2006/0087582 A1 | 4/2006 | Scharenbroch et al. | |
| 2006/0167595 A1 | 7/2006 | Breed et al. | |
| 2006/0176160 A1 | 8/2006 | Zoratti et al. | |
| 2007/0109104 A1 | 5/2007 | Altan et al. | |
| 2007/0159531 A1 | 7/2007 | Anderson | |
| 2008/0195273 A1 | 8/2008 | Matsuura et al. | |
| 2008/0204556 A1 | 8/2008 | De Miranda et al. | |
| 2009/0010494 A1 | 1/2009 | Bechtel et al. | |
| 2009/0040306 A1 | 2/2009 | Foote et al. | |
| 2009/0096937 A1 | 4/2009 | Bauer et al. | |
| 2009/0116097 A1 | 5/2009 | Mccabe et al. | |
| 2010/0046059 A1 | 2/2010 | Mccabe et al. | |
| 2010/0066534 A1 | 3/2010 | Takeichi et al. | |
| 2012/0162430 A1 | 6/2012 | Heslin et al. | |
| 2012/0212571 A1 | 8/2012 | Wang et al. | |
| 2012/0310547 A1 | 12/2012 | Cristoforo | |
| 2014/0015971 A1 | 1/2014 | Dejuliis | |
| 2014/0112554 A1 | 4/2014 | Chiu et al. | |
| 2014/0139655 A1 | 5/2014 | Mimar | |
| 2014/0168435 A1 | 6/2014 | Tuhro et al. | |
| 2014/0207344 A1 | 7/2014 | Ihlenburg et al. | |
| 2014/0340516 A1 | 11/2014 | Vojtisek et al. | |
| 2015/0054934 A1 | 2/2015 | Haley et al. | |
| 2015/0070156 A1 | 3/2015 | Milburn, Jr. | |
| 2015/0085121 A1 | 3/2015 | Englander et al. | |
| 2015/0201161 A1 | 7/2015 | Lachapelle et al. | |
| 2015/0331519 A1 | 11/2015 | Lindahl et al. | |
| 2016/0029111 A1 | 1/2016 | Wacquant et al. | |
| 2017/0324933 A1 | 11/2017 | Alrod et al. | |
| 2017/0347067 A1* | 11/2017 | Bostrom | B60K 35/00 |
| 2018/0099612 A1 | 4/2018 | Weller et al. | |
| 2018/0376108 A1* | 12/2018 | Bright-Thomas | G06V 20/40 |
| 2020/0213560 A1* | 7/2020 | Zhang | H04N 7/147 |
| 2021/0211603 A1 | 7/2021 | Shih et al. | |
| 2022/0068140 A1* | 3/2022 | Brandon | G06Q 50/01 |
| 2022/0198774 A1* | 6/2022 | Wang | H04N 7/147 |

FOREIGN PATENT DOCUMENTS

| | | |
|---|---|---|
| CN | 212696104 U | 3/2021 |
| EP | 2179586 B1 | 3/2017 |
| JP | 2004136761 A | 5/2004 |
| JP | 2006205923 A | 8/2006 |
| JP | 2007125963 A | 5/2007 |
| JP | 2008186793 A | 8/2008 |
| JP | 2019505429 A | 2/2019 |
| KR | 101900470 B1 | 9/2018 |
| WO | 2015174383 A1 | 11/2015 |
| WO | 2016021302 A1 | 2/2016 |

OTHER PUBLICATIONS

Marshall, Aarian, "Dodge's Charger Gives Cops Eyes in the Backs of Their Heads," Wired, Feb. 11, 2017, 41 pages, Web, <https://www.wired.com/2017/02/dodges-charger-gives-cops-eyes-backs-heads/>.

Hogan, Mack, "Dodge to Use its Parking Tech to Protect Police From Ambush Attacks," CNBC, Feb. 10, 2017, 4 pages, Web, <https://www.cnbc.com/2017/02/10/dodge-to-use-its-parking-tech-to-protect-police-from-ambush-attacks.html>.

"Dodge's New Police Cars Have a Feature That Make Them a Cops Best Friend," Alt Driver, Jul. 27, 2017, 7 pages, Web, <http://altdriver.com/good-guy-bad-guy-dodge-charger-pursuit-cop-car-ambush-sensors/>.

* cited by examiner

INTELLIGENT VIDEO CONFERENCE CROPPING BASED ON AUDIO AND VISION

CROSS REFERENCE TO RELATED APPLICATION

This application claims the benefit under 35 U.S.C. § 119(e) to U.S. Provisional Patent Application No. 63/250,495, filed Sep. 30, 2021, entitled "INTELLIGENT VIDEO CONFERENCE CROPPING BASED ON AUDIO AND VISION," which is incorporated herein by reference in its entirety.

BACKGROUND

The present disclosure generally relates to a video conferencing system for a vehicle and, more particularly, to a video conferencing system transmitting a cropped view from the vehicle cabin.

Video conferencing has become an increasingly important means of communicating. Previously, options existed for users to participate in conference calling using audio. Advances in providing convenient use of video images of vehicle passengers to accompany audio may, however, be desired.

SUMMARY

According to one aspect of the present disclosure, a video conferencing system for a vehicle includes a display device disposed in a passenger compartment of the vehicle, the display device comprising a screen, a first imager configured to capture a first image data corresponding to a field of view of a passenger compartment of the vehicle, at least one microphone configured to collect audio data from within the passenger compartment, and a controller. The controller is configured to detect a display prompt within the image data corresponding to a portion of the image data received from the first imager, detect an audio prompt within a predetermined zone of the passenger compartment of the vehicle, and selectively crop the first image data according to the portion of the image data corresponding with the display prompt in response to determining a correlation between the portion of the image data and the zone of the passenger department associated with the audio prompt.

According to a further aspect of the disclosure, a video conferencing system for a vehicle includes a first imager configured to capture a first image data corresponding to a field of view of a passenger compartment of the vehicle, a plurality of microphones in respective predetermined locations within the passenger compartment and configured to collect audio data from within the passenger compartment and a controller. The controller is configured to detect a display prompt within the image data corresponding to a portion of the image data received from the first imager, detect an audio prompt at least primarily from one of the plurality of microphones within a predetermined zone of the passenger compartment of the vehicle corresponding with the predetermined location of the one of the plurality of microphones, and selectively crop the first image data according to the portion of the image data corresponding with the display prompt in response to determining a correlation between the portion of the image data and the zone of the passenger compartment associated with the audio prompt.

According to a further aspect of the disclosure, a video conferencing system for a vehicle includes a first imager configured to capture a first image data corresponding to a field of view of a passenger compartment of the vehicle and a plurality of microphones in respective predetermined locations corresponding with respective ones of a plurality of seating locations within the passenger compartment and configured to collect audio data from within the passenger compartment. A controller is configured to monitor for a display prompt within the image data corresponding to a portion of the image data received from the first imager, monitor for an audio prompt at least primarily from one of the plurality of microphones within one of the seating locations, determine a correlation between the portion of the image data and the seating area of the passenger compartment associated with the audio prompt, and selectively crop the first image data according to the portion of the image data corresponding with the display prompt. In some aspects, the video conferencing system may further include a display device disposed in a passenger compartment of the vehicle, the display device comprising a screen, the controller can, accordingly, be further configured to transmit the cropped portion of the image data and at least a portion of the audio data to an external conference server and to receive video and audio data from the conference server.

These and other features, advantages, and objects of the present device will be further understood and appreciated by those skilled in the art upon studying the following specification, claims, and appended drawings.

BRIEF DESCRIPTION OF THE DRAWINGS

The present invention will become more fully understood from the detailed description and the accompanying drawings, wherein.

DETAILED DESCRIPTION OF EMBODIMENTS

Figure 1:
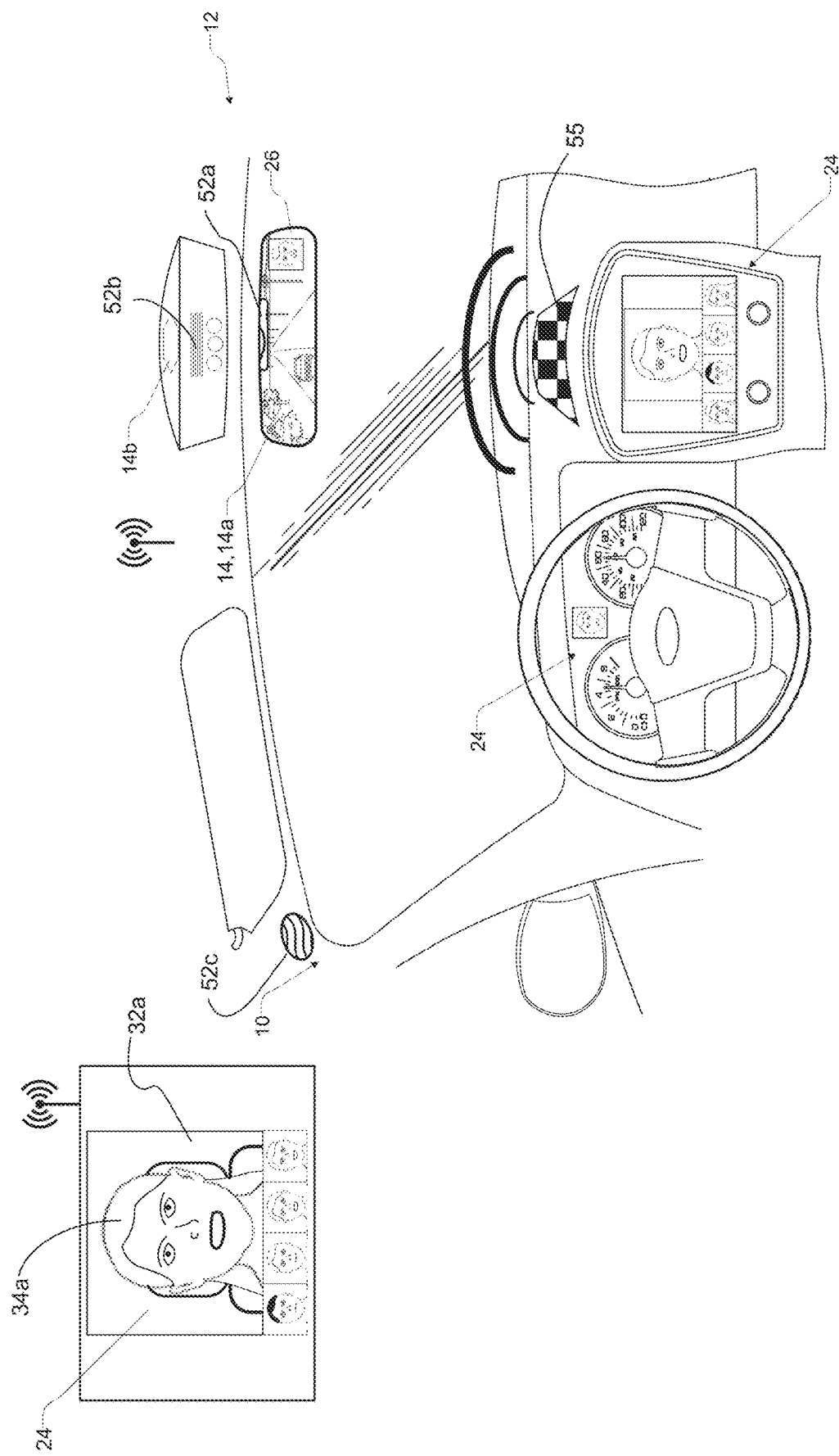
FIG. 1 is a perspective view of an occupant compartment of a vehicle comprising a display system.

The present illustrated embodiments reside primarily in combinations of method steps and apparatus components related to an imaging and display system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-4, a vehicle 10 is shown equipped with a video conference system 12. In various aspects, the video conference system 12 may comprise at least one imager 14. The imager 14 may correspond to a plurality of imagers 14. The plurality of imagers 14 may include a first imager 14a configured to capture a first image data 16a corresponding to a first interior field of view 17 of an occupant compartment 18 of the vehicle 10. The conference system 12 may further comprise at least one microphone 52 configured to capture a first audio data 53 corresponding to first interior sound field of the occupant compartment 18 of the vehicle. A controller 40 (FIG. 5) receives the image data 16a and the audio data 53a for transmission to an external conference server 60, such as by a cellular data connection (including, but not limited to, 4G, LTE, or 5G data networks or the like, WiFi, or other mobile or long-range data networks). The image data 16 and audio data 53 are then processed by a processor 62 associated with the server 60 for output to one or more third-party devices in various configurations, as determined by the processor 62. Additionally, the server 60 sends data back to the conference system 12 that may include the image data 16a from the system 12 and additional image and audio data 16, 53 received from the third party devices 112 in a configuration specific to the conference system 12 and determined by the processor 62 according to various considerations.

In an example, the conference system 12 may be configured to selectively crop the image data 16 prior to transmission to the server 60 such that only a portion 32 of the image data 16 is transmitted. In one aspect, the portion 32 of the image data 16 transmitted by the system 12 may correspond with a predetermined area 54 of the field of view 17 of the imager 14 that includes an occupant 34 of the vehicle 10 that the system 12 determines is speaking. System 12 can determine that one of the occupants 34 of the vehicle 10 is speaking based on a fusion of data received from the imager 14 and an audio system 55 in which the above microphone 52a is included. More particularly, as discussed further below, the imager 14, either directly or by way of the controller 40 to which the imager 14 is connected, can apply an algorithm or series of algorithms (at least some of which may include various machine learning functionality) to the image data 16 to recognize the faces 44 of the occupants 34 of the vehicle 10 and to detect, for example within the facial recognition 44, various facial features 46 and to monitor them for a "display prompt" indicating, for example, that the occupant 34 is speaking, such as movement of the jaw, mouth, or the like. As can be appreciated, such an algorithm may indicate both a portion 32 of the field of view 17 within the image data 16 where the facial region 44 associated with the display prompt is located and a confidence score associated with the facial region 44 and display prompt.

Additionally, the audio system 55 may comprise one or more microphones 52 within the cabin 18. In various non-limiting examples, the microphones 52 can comprise one or more directional microphone arrays 52a, 52b positioned respectively in the vehicle rearview assembly 56 and a headliner module 51, alone or in combination with a number of far-field microphones 52c-52f located over the various seating areas 20 or in the corners of the cabin 18. The audio system 55 and/or the controller 40 can include audio processing capability that can correlate the audio data 53a-53f, for example, associated with each of the microphones 52a-52f in the cabin 18 into a single audio signal for output to the server 60 (among other purposes) while maintaining the source audio data 53a-53f for additional processing purposes. In one aspect, the audio data 53a-53f can be processed to identify an audio prompt, such as sound that is identifiable by the system as speech (including by recognizing indicating patterns in the audio data, such as by way of a comparison with pre-stored data, using machine learning, or combinations thereof). When an audio prompt is identified, the data 53a-53f can be further processed, either by reprocessing the data 53a-53f at the instance of the audio prompt or by ongoing processing as long as the audio prompt is maintained, to determine the data 53a-53f in which the portion of the audio identified as the audio prompt is the loudest (i.e., has the highest amplitude). Other forms of signal processing can be used to determine the particular zone 54 from which the audio prompt originated, including various "triangulation" methods and/or various spatial audio processing. The audio system 55 or the controller 40 can also know the location of the various microphones 52a-52f and/or the orientation of any directional microphones 52a,52b such that analysis of the audio data 53a-53f can output information indicating a zone 54a-54e within the cabin 18 from which the audio prompt is determined to have originated. As with the determination of the display prompt and corresponding portion 32 of the image data 16, the determination of the audio prompt and corresponding zone 54a-54e can be accompanied by a confidence score.

By correlating the criteria for the display prompt and the audio prompt or additional output of a class of the display prompt and audio prompt (e.g., speech), the controller 40 can identify a correlation between the image data portion 32 and the zone 54a-54e associated with the display prompt and audio prompt to confirm proper identification of a speaking occupant 34 of the vehicle 10. As can be appreciated, such correlation would result in an overall, or combined, confidence score that is higher than either of the original confidence scores associated with the image data portion 32 and the zone 54a-54e alone.

Once the data portion 32 corresponding with the zone 54 in which an occupant 34 of the vehicle 10 is determined, the system 12, by way of imager 14 and/or controller 40, can apply a cropping operation to the image data 16 such that only the data portion 32 is transmitted to the server 60. Such image processing can be done according to various means, including simple cropping, where only the specific pixel data associated with the data portion 32 is transmitted, with the rest of the data being truncated. Accordingly, the overall image size transmitted to server 60 will be proportionally reduced. In another application, the image data 16 within the image data portion 32 can be rescaled using a digital zoom function, including using any of various algorithms to interpolate new pixel data to fill the space between the pixel data corresponding with the image data portion 32 to provide an overall image that is on the order or the original image data 16 size (minus any cropping/data truncating to change the aspect ratio). In a still further example, some conference call platforms executed by various implementations of the server 60 may include cropping functionality within the capabilities of the server 60 processor 62 such that performance may be improved by transmitting the entirety of the image data 16 along with cropping (or zoom and/or scale information)

such that the processor 62 can crop the image data 16 to the area 34 determined by system 12, along with any additional image processing carried out by the server 60 processor 62. In one example, the controller 40 can include in memory 66 various applications associated with known conference call platforms. Alternatively, the controller 40 can include one conferencing application with functionality for interoperability with various platforms according to application platform interface data provided by the platform operators and integrated into the conference application programming. As can be appreciated, such implementations can allow the user access to additional functionality provided by the server 60 operator according to the expected use of such platforms.

The specific size of the image data portion 32 for cropping can be determined based on predetermined subsets of the image data 16 that generally correlate with the respective zones 54 within cabin 18. Alternatively, the imager 14 and/or controller 40 can determine the size of the data portion 32 based on the image processing used to identify the display prompt. For example, the image data portion 32 can be determined in proportion to specific features 46 identified within the facial recognition 44. In one implementation, the image data portion 32 can be correlated with the spacing between the eyes or ears in the horizontal direction and/or the vertical spacing between the eyes and the mouth or the eyes and the chin. This can be done according to a predetermined proportion or a predetermined pixel border around the identified features and/or can be a best fit in either the horizontal or vertical directions according to a predetermined ratio. The system 12 may provide the ability for the user to adjust the proportionality, border, or aspect ratio, or such adjustments may be provided by the conference server 60 platform.

According to the specific example of the system 12 shown in the vehicle 10 of FIGS. 1-4, the conference system 12 is configured to transmit the selected portion 32 of image data 16 received from imager 14, directed rearward within the cabin 18 of the vehicle 10, and in combination with audio data 53 to external conference server 60 so that one or more occupants 34 of the vehicle 10 can participate in a conference call, including using video. Additionally, the conference system 12 is configured to output audio received from the conference server 60 and to display video from the conference server 60 on one or more display screens 32 within the vehicle cabin 18. As can be appreciated, the video image received from the server and shown on the display screens 32 can be a composite image of video data received from other conference participants, which may include the portion 32 of the image data 16 originally transmitted by conference system 12.

As discussed above, the entirety of the image data 16 or only a portion 32 of the image data 16 may be transmitted selectively by the system 12 throughout operation thereof. More particularly, the first image data 16 or a selected portion 32 of the image data 16 may be selectively transmitted in response to one or more of a detection of a feature or identification of an event in the image data 16. In the illustrated embodiment, the imager 14 discussed above is a first imager 14a mounted in the rearview assembly 56, and the system 12 includes a second imager 14b disposed, for example, in the depicted headliner module 51. In such an embodiment, the system 12 can further selectively transmit image data 16a received from the first imager 14a or image data 16b from the second imager 14b and/or may selectively transmit portions 32 of either the first image data 16a or the second image data 16b according to the principles discussed above. The image data 16a and/or 16b may be selectively displayed and/or cropped in response to one or more input signals or operating conditions of the vehicle 10. The conference system 12 may comprise a controller 40 configured to identify the feature or the event in the image data. Additionally, the controller 40 may be configured to selectively display the image data 16a and/or 16b or portions 32 thereof in response to the one or more input signals or operating conditions of the vehicle 10. In this configuration, the conference system 12 may provide for a flexible solution that may be utilized to display image data for video conference call or other applications. The controller is further discussed in reference to FIG. 5.

The controller 40 comprises one or more processors and/or control circuits configured to process the image data 16a or 16b received from the first imager 14a and/or the second imager 14b. The controller 40 processes the first image data 16a from the first imager 14a to identify a display-prompt (e.g. a gesture, motion, or speech) of an occupant 34 of the vehicle 10. In response to detecting the display-prompt of the occupant 34, the controller 40 may control the display system 12 to transmit a portion of interest of the occupant 34 in a display window 42 on the display screen 32. The portion of interest may correspond to a facial region 44 of the occupant 34 that may be cropped and/or otherwise processed for display in the display window 42. In this configuration, the display system 12 may be configured to selectively display the portion of interest of the image data 16a in response to the controller 40 identifying the display-prompt.

As discussed herein, an occupant 34 may correspond to a person (e.g. adults, children), an animal (e.g. a pet), and/or any object of interest in the occupant compartment 18. The imagers 14 discussed herein are demonstrated in fixed locations in connection with the vehicle 10. However, in some embodiments, the imagers 14 may be flexibly utilized in various portions of the vehicle 10. In such embodiments, one or more of the imagers 14 may be configured to communicate wirelessly (e.g. via Bluetooth™, WiFi™, ZigBee, etc.) with the controller 40. In this configuration, one or more of the imagers 14 may be selectively positioned in connection with the vehicle 10 such that the controller 40 may detect a display-prompt corresponding to motion of objects positioned in a field of view. Additionally, with reference to FIG. 4, the conference system 12 further comprises a plurality of microphones 52 that may be configured to detect speech or noise corresponding to the occupants 34 of the vehicle 10, including by being positioned in locations known to correlate with (such as by being adjacent to) the various seats and/or seating areas 20 of the vehicle. As discussed above, the detection of such speech is utilized by the controller 40 as an audio prompt that is utilized in connection with the display prompt to increase the accuracy of system 12 in identifying the relevant portion 32 of the image data 16 for cropping and transmission to server 60. The one or more microphones 52 may correspond to a microphone array operable to detect the region 54 in the occupant compartment 18 from which the noise or speech originated, such as by being in a known location that at least partially corresponds with the region 54 (such as by being adjacent thereto or located therein). Based on the audio signal, the controller 40 may identify whether a noise in the audio signal originated in one of a plurality of regions 54 of the occupant compartment 18. For example, the controller 40 may be operable to distinguish if the noise originated in a first region 54a, a second region 54b, a third region 54c, a fourth region 54d, or a fifth region 54d of the occupant compartment 18, with such regions generally corresponding with the seating locations within the vehicle 10 (with fewer or additional zones and/or alternative zone arrangements being possible for different vehicles). The controller 40 may then utilize this information to confirm the display prompt or otherwise inform the selection of the portion 32 of image data 16 including the facial region 44 associated with the display prompt.

Figure 2:
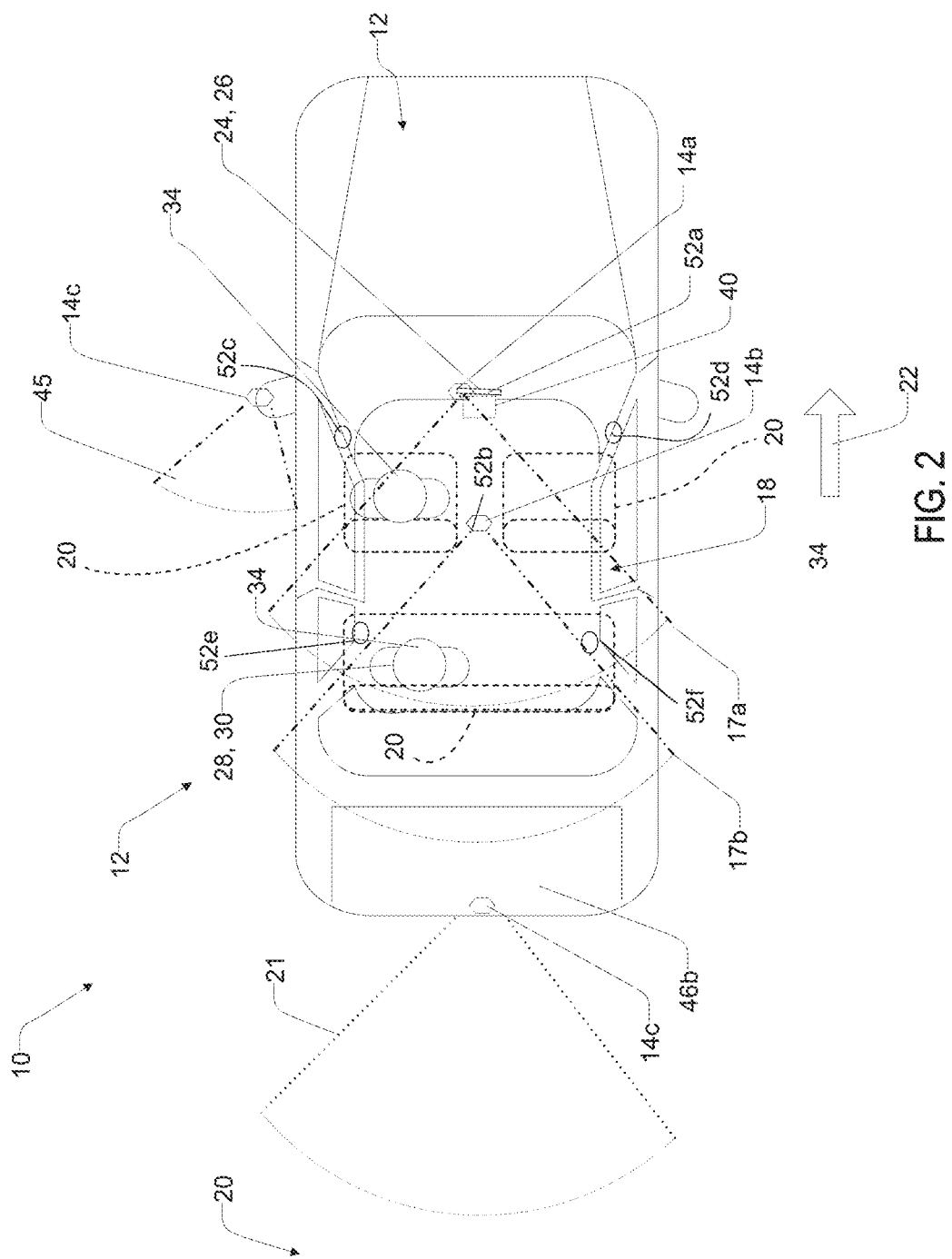
FIG. 2 is an elevational view of a vehicle comprising a display device configured to display image data including a feature of an occupant of the vehicle.
Figure 3B:
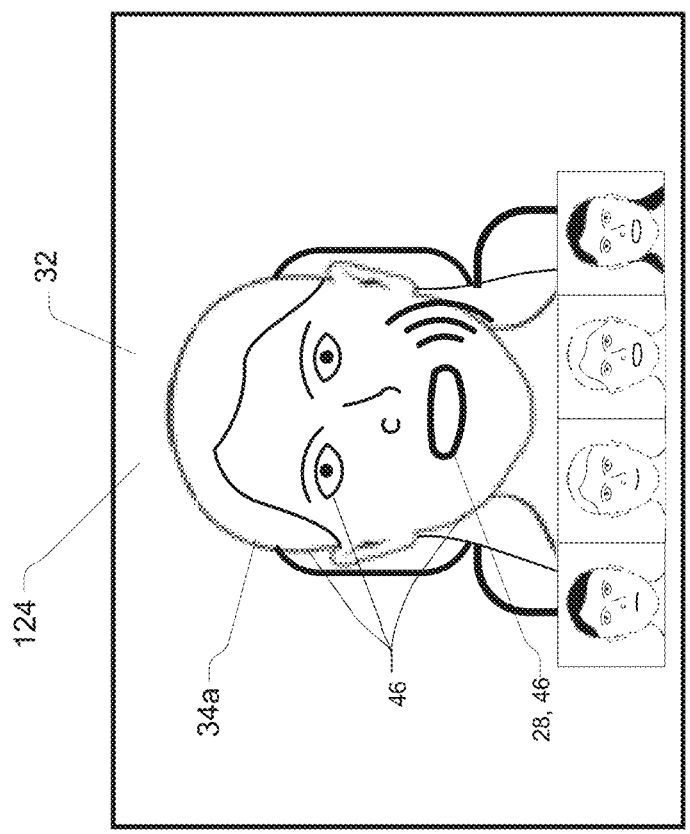
FIGS. 3A and 3B are views of a third-party device display showing image data received from the vehicle conference system configured to display image data including a feature of an occupant of the vehicle.
Figure 3A:
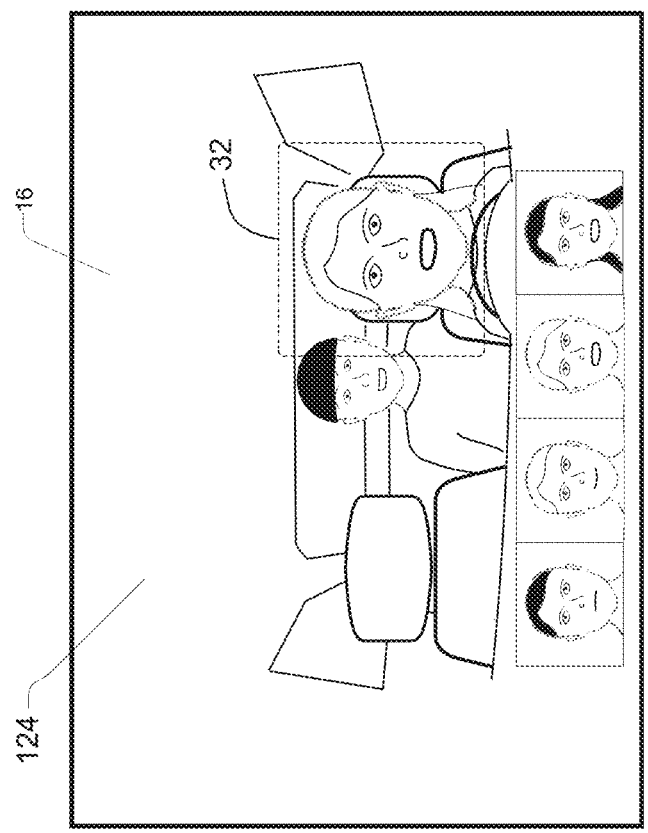
Figure 4:
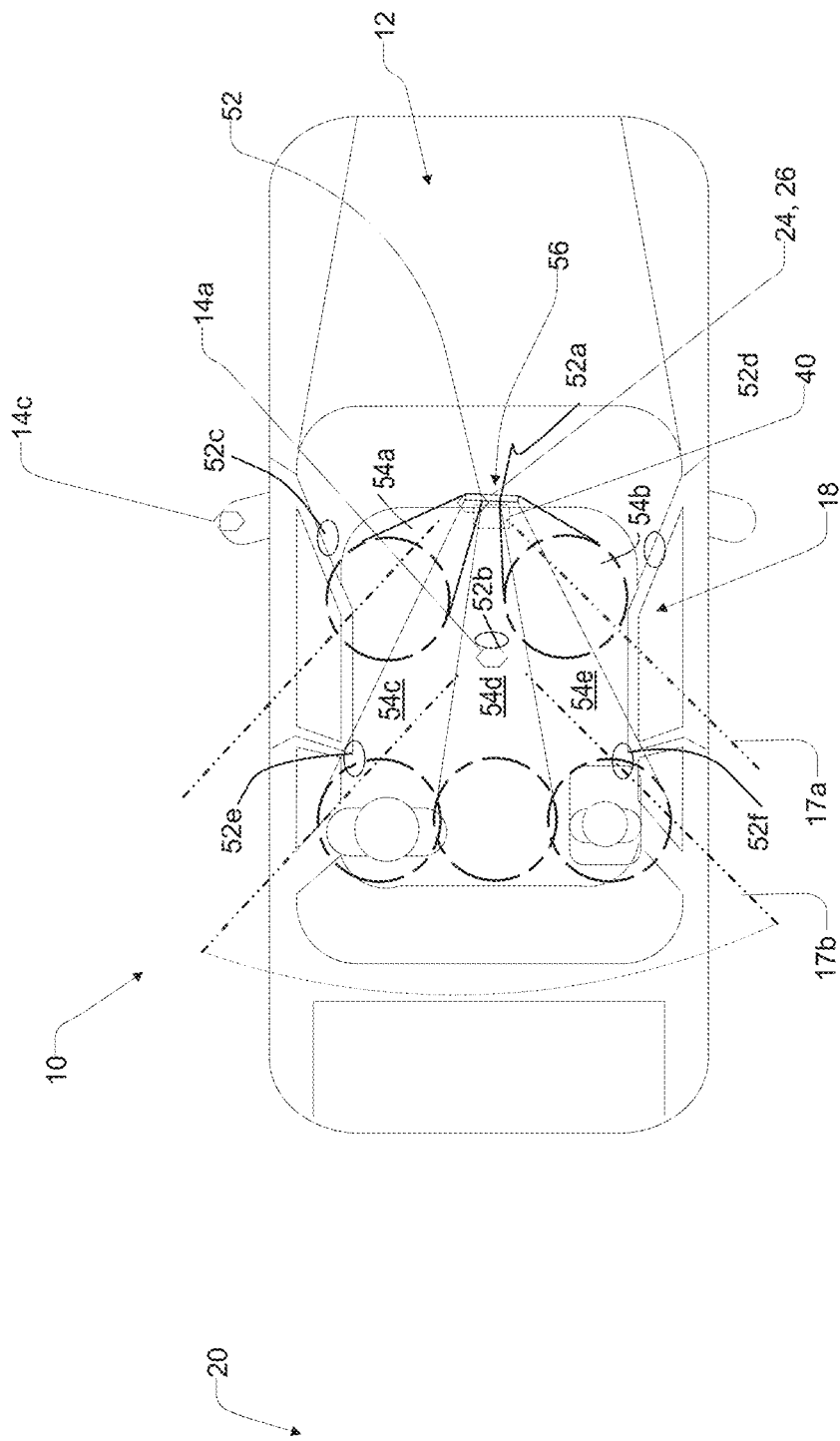
FIG. 4 is an elevational view of the display system of FIG. 2 further demonstrating a sound detecting embodiment of the display device.

Referring back to FIGS. 2, 3A, and 3B, the controller 40 may be configured to identify the display-prompt as a motion of a facial feature 48 (e.g. a mouth, jaw, eye, etc.) that may correspond to speech of the occupant 34, including of the driver 34a, as shown in FIGS. 1-3B. In response to the detection of the display-prompt in the image data 16a, the controller 40 may crop the transmitted image data, as discussed above, to the facial region 44 of the occupant 34 for transmission to the server 60. The controller 40 may continue to detect movement of the one or more facial features 46 and continue to transmit the cropped image portion 32 corresponding with the facial region 44 in the display window 42 until the motion of facial features 46 is not detected for a predetermined period of time or until a display prompt is detected elsewhere in the image data 16 that may, for example, indicate that another occupant 34 of the vehicle cabin 18 is speaking. In this way, the controller 40 may selectively transmit the facial region 44 during temporal periods during which the occupant 34 may be moving or speaking. In instances where, for example a conference call has just begun and no occupants 34 of the vehicle cabin 18 may be speaking, the system 12 can transmit the entire image data 16, for example, from a "primary" imager, such as imager 14a, or a selected imager (which can include imager 14b), as shown in FIG. 3A. When, for example, the driver 34a is identified as speaking, the system 12 may begin transmitting the cropped image portion 32, as shown in FIG. 3B. Additionally, the system 12 may crop a larger portion 32 of the image data 16 when one or more occupants 34 are determined to be speaking.

The motion detected by the controller 40 corresponding to the display-prompt may correspond to a detected motion of one or more of the facial features 46 exceeding a motion threshold. The controller 40 may identify that the detected motion has exceeded the motion threshold by identifying motion of pixel data corresponding to the one or more facial features 46 moving in excess of a predetermined distance over a plurality of consecutive frames captured by the first imager 14a. Such an identification of the one or more facial features 46 may result in the controller 40 triggering the display prompt and transmit the facial region 44 of the occupant 34 to the server 60 until another display prompt is detected.

The one or more microphones 52 may utilize various detection methods to distinguish the region 54 of the occupant compartment 18 from which the noise originated. To enable such detection, the one or more processors of the controller 40 may comprise a digital signal processor (DSP) in communication with the one or more microphones 52. The DSP may process the audio signals from the microphone 52 (including a single directional array microphone, such as microphone 52a) or microphone array via beam forming, and/or polar steering to determine a particular region of the plurality of regions 54 from which a noise originated. Further details regarding the detection of a region from which one or more noises may be detected are discussed in U.S. Pat. No. 7,447,320 entitled, "Vehicle Accessory Microphone," which is incorporated by reference in its entirety. Accordingly, the controller 40 may utilize the indication of the region from which a noise in the occupant compartment 18 originated to search the image data 16 for a facial region 44 to display on the display device 24. The controller 40 may continue to display the facial region 44 throughout a detection of the motion or speech originating from the region 54. The controller 40 may continue to display the facial region 44 on the display device 24 for a predetermined time as previously discussed or until speech within another region 54 is detected, including for a predetermined volume, motion, or durational threshold.

Though discussed in detail in reference to the rearview assembly 56, the one or more microphones 52 may be disposed in various portions of the vehicle 10. For example, the one or more microphones 52 may be disposed in a headliner (microphones 52b, 52e, and 52f), a pillar (microphones 52c and 52d), a seat, door panel, or various portions of the vehicle 10. Accordingly, the microphones 52 may be flexibly positioned in the vehicle 10 to suit a particular application. Additionally, once the controller 40 determines the zone 54a-54e correlated with the portion 32 of the image data 16 within which the display prompt is identified, the controller 40 can selectively disable any microphones 52 outside of the zone 54a-54e within which the corresponding audio prompt is identified. In the example of FIGS. 2, 3A, and 3B, the controller 40 can disable microphones 52b, and 52d-f in response to the audio prompt being detected in zone 54a.

As discussed, one microphone or directional array 52a, as well as the imager 14a may be disposed in the rearview assembly 56, which may correspond to one of the display devices 24. The rearview assembly 56 may be configured to operate in a mirror mode as well as a display mode. In the display mode, the display device 24 may be configured to display various portions of the data 16 on the display screen 25 thereof, such as image data 16c from a rear-facing exterior camera 16c, as well as all or a portion of the image data 116 received from the conference server 60. Additionally, in some embodiments, the rearview assembly may correspond to an electro-optic or electrochromic mirror assembly. Accordingly, the disclosure may incorporate a display screen for use in an automotive vehicle that may correspond to a mirror-display as disclosed in U.S. Pat. Nos. 6,870,655; 6,737,630; 6,572,233; 6,552,326; 6,420,800; 6,407,468; 6,346,698; 6,170,956; 5,883,605; and 5,825,527, U.S. patent application Ser. No. 12/193,426 entitled "Vehicle Rearview Assembly Including A Display for Displaying Video Captured by a Camera and User Instructions," and U.S. patent application Ser. No. 12/196,476 entitled "Discrete LED Backlight Control for a Reduced Power LCD Display System," all commonly assigned to Gentex Corporation and all of which are incorporated herein by reference in their entireties. In a further aspect, the rearview assembly 56 may be also be a component of a driver detection system that may use the above-described first imager 14a and the facial recognition capability to detect and monitor the behavior of the driver 34a of the vehicle. In such aspects, the additional use of the audio prompt fusion with the display prompt may help improve the accuracy of the driver detection system in certain operating conditions.

Figure 5:
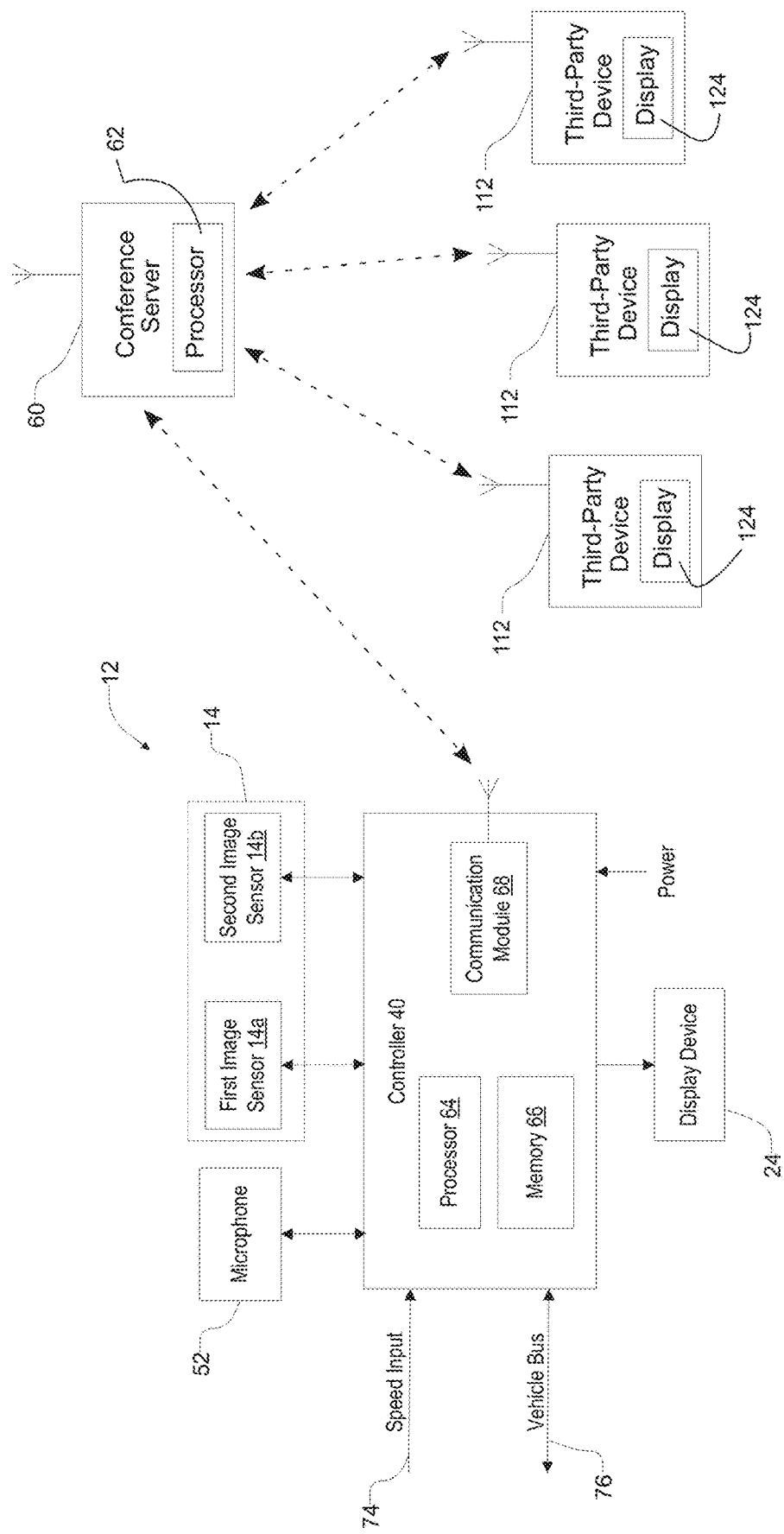
FIG. 5 is a block diagram of a display system in accordance with the disclosure.

Referring now to FIG. 5, a block diagram of the conference system 12 is shown. The imager 14 (e.g. the first imager 14a and/or the second imager 14b) is shown in communication with the controller 40. A pixel array of the imagers 14 may correspond to a CMOS image sensor, for example a CMOS active-pixel sensor (APS) or a charge coupled device (CCD). Each of the pixels of the pixel array may correspond to a photo-sensor, an array of photo-sensors, or any grouping of sensors configured to capture light. The controller 40 may comprise a processor 64 operable to process the image data as supplied in analog or digital form from the imager(s) 14. In various embodiments, the processor 64 may be implemented as a plurality of processors, a multicore processor, or any combination of processors, circuits, and peripheral processing devices.

In some embodiments, one or more of the imagers 14 may correspond to infrared imaging devices. Such devices may comprise lighting modules configured to project infrared radiation. For example, the second imager 14b may correspond to an infrared imaging device. In such an embodiment, the controller 40 may be configured to receive infrared image data corresponding to one or more of the occupants 34 of the vehicle 10. In this configuration, the controller 40 may utilize the infrared image data to identify the occupant 34 based on a retinal identification or various identification algorithms.

The controller 40 may further comprise a memory 66. The memory 66 may comprise various forms of memory, for example, random access memory (RAM), dynamic RAM (DRAM), synchronous DRAM (SDRAM), and other forms of memory configured to store digital information. The memory 66 may be configured to store the image data 16 (e.g. the first image data 16a and/or the second image data 16b) for processing. Processing the image data 16 may comprise scaling and cropping the image data 16 to adjust a position and apparent size of the image data 16 as it is output to the display screen 32 of the display device 24. In some embodiments the memory 66 may further be configured to store additional programming information including method and processes for operation of the display system 12.

The one or more imagers 14 may be configured to communicate with the controller 40 via a wired or wireless connection to suit a desired application. Some examples of wireless communication protocols may include Bluetooth™, WiFi™, ZigBee, and similar wireless communication protocols including those yet to be developed. Accordingly, the controller 40 may comprise a communication module 68 configured to communicate wirelessly with one or more of the imagers 14. In a wireless configuration, the imagers 14 may correspond to a modular configuration comprising a battery 70 as exemplified by the third imager 14c. The modular configuration may further comprise a communication circuit 72 configured to communicate wirelessly with the communication module 68 of the controller 40.

The controller 40 may further be in communication with a plurality of inputs—for example, a speed input 74, and a vehicle bus 76. The speed input 74 may provide a signal communicating a speed of the vehicle 10 via a speedometer or any device operable to measure and communicate data corresponding to the speed of a vehicle 10. The vehicle bus 76 may be implemented using any suitable standard communication bus, such as a Controller Area Network (CAN) bus, a Local Interconnect Network (LIN) bus, etc. The vehicle bus 76 may be configured to provide a variety of additional information to the controller 40. Such information may correspond to one or more vehicle states, for example a gear selection, occupant occupancy, a headlight activation, etc., which may be utilized by the controller to control the display of the image data. For example, the controller 40 may selectively display the first image data 16a, the second image data 16b, and or a third image data 16c in response to the one or more vehicle states. In this respect, the conference system 12 can leverage various vehicle 10 data to select various operating states thereof. For example, the controller 14 can be configured to only display the image data 116 received from the conference server 60 on the rearview assembly 56 display 24 or other front-cabin displays 24 when the vehicle is not in motion and/or in park.

Though discussed as having a modular or portable wireless design configured to be selectively located or positioned on the vehicle 10, the third imager 14c may be located in a fixed position in connection with the vehicle 10. Additionally, the first imager 14a and/or the second imager 14b may be configured to communicate the image data 16 to the controller 40 wirelessly. Accordingly, the imager 14 may be utilized in a variety of applications to display information corresponding to various portions of the vehicle 10. Further details regarding the imagers 14 and controller 40 are discussed in reference to FIG. 5. As discussed, the system 12 is configured, as shown for wireless data transmission to server 60 and to receive data back from the server 60, which can be a composite of original data from the server 60, including audio and video data received from third party devices 112 corresponding with additional participants of a conference call in which, for example, the driver 34a of the vehicle 10 is participating.

The disclosure provides for the controller 40 to utilize one or more of the detection of motion of the facial features 46 and/or an indication of a region 54 from which a noise in the occupant compartment 18 originated to identify an occupant 34 is speaking in the occupant compartment 18. Based on the detection, the controller 40 may identify a display-prompt and transmit the corresponding portion 32 of the relevant image data 16 of the occupant compartment 18. Additionally, the controller 40 may transmit the portion 32 of the image data 16 to the server 60 at various points during operation of the vehicle 10 and/or in response to various vehicle operating conditions.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A video conferencing system for a vehicle comprising:
   a first imager configured to capture a first image data corresponding to a field of view of a passenger compartment of the vehicle;
   a plurality of microphones in respective predetermined locations corresponding with respective ones of a plurality of seating locations within the passenger compartment and configured to collect audio data from within the passenger compartment, wherein one of the plurality of seating locations corresponds with a driver seat location; and
   a controller in communication with a vehicle network and configured to:
      receive information related to a vehicle motion state from the vehicle network and determine that the vehicle is not in a motion state;
      monitor for a display prompt within the image data corresponding to a portion of the image data received from the first imager;
      monitor for an audio prompt at least primarily from one of the plurality of microphones within one of the seating locations;
      determine a correlation between the portion of the image data and the seating area of the passenger compartment associated with the audio prompt, including if the seating area of the passenger compartment associated with the audio prompt is the driver seating location;
      responsive to the vehicle being in a motion state, selectively crop the first image data according to the portion of the image data corresponding with the display prompt, only if the seating area of the passenger compartment associated with the audio prompt is not the driver seating location; and
      responsive to the vehicle not being in a motion state, selectively crop the first image data according to the portion of the image data corresponding with the display prompt.

2. The video conferencing system of claim 1, further comprising a display device disposed in a passenger compartment of the vehicle, the display device comprising a screen, wherein:
   the controller is further configured to transmit the cropped portion of the image data and at least a portion of the audio data to an external conference server; and
   the controller is further configured to receive video and audio data from the conference server.

3. The video conferencing system of claim 1, wherein the display prompt corresponds to a detection of a movement of one or more features of an occupant of the vehicle identified in the first image data.

4. The video conferencing system of claim 1, wherein the audio prompt corresponds to a detection of a sound identifiable as speech.

5. The video conferencing system of claim 1, wherein the controller is further configured to detect at least one of a gesture and a motion of an occupant in the portion of image data to identify the display prompt.

6. The video conferencing system of claim 1, wherein the portion of the image data and includes a facial region of the occupant.

7. The video conferencing system of claim 6, wherein the portion of the image data includes an area surrounding the facial region according to one of a predetermined fixed border or a proportion of recognized features defining the facial region.

8. The video conferencing system of claim 1, wherein the controller is further configured to digitally scale the selectively cropped first image data to an image size on an order of the first image data before the first image data is selectively cropped.

* * * * *